US012496475B2

(12) United States Patent
Andrade et al.

(10) Patent No.: US 12,496,475 B2
(45) Date of Patent: Dec. 16, 2025

(54) WEB HARNESS SYSTEM WITH LEG COMPONENTS

(71) Applicant: Alexander Andrew, Inc., Compton, CA (US)

(72) Inventors: Samuel Raymond Andrade, Norwalk, CA (US); John F. Aldrich, Solvang, CA (US)

(73) Assignee: Alexander Andrew, Inc., Compton, CA (US)

(*) Notice: Subject to any disclaimer, the term of this patent is extended or adjusted under 35 U.S.C. 154(b) by 898 days.

(21) Appl. No.: 17/706,440

(22) Filed: Mar. 28, 2022

(65) Prior Publication Data

US 2023/0302308 A1 Sep. 28, 2023

(51) Int. Cl.
*A62B 35/00* (2006.01)

(52) U.S. Cl.
CPC ...... *A62B 35/0018* (2013.01); *A62B 35/0037* (2013.01)

(58) Field of Classification Search
CPC ............ A62B 35/0018; A62B 35/0037; A62B 35/0025
See application file for complete search history.

(56) References Cited

U.S. PATENT DOCUMENTS

| | | | | |
|---|---|---|---|---|
| 6,390,348 B1 * | 5/2002 | Godshaw | B25H 3/00 224/660 |
| 6,446,852 B1 * | 9/2002 | Sorensen | A45F 3/14 224/904 |
| 10,682,538 B2 * | 6/2020 | Blondeau | A62B 35/0025 |
| 11,432,639 B2 * | 9/2022 | Wold | A45F 3/14 |
| 2015/0305478 A1 * | 10/2015 | Krol | A45F 5/021 224/148.6 |
| 2018/0369621 A1 * | 12/2018 | Blondeau | A62B 35/0025 |
| 2019/0070442 A1 * | 3/2019 | Jacob | A62B 35/0025 |
| 2019/0308040 A1 * | 10/2019 | Blondeau | A62B 35/0025 |
| 2020/0108294 A1 * | 4/2020 | Nance | A62B 35/0031 |
| 2020/0206551 A1 * | 7/2020 | Dzugan | A62B 35/0031 |
| 2020/0360739 A1 * | 11/2020 | Truesdell | A44B 13/0029 |
| 2021/0170207 A1 * | 6/2021 | Jain | A62B 35/0018 |
| 2022/0040510 A1 * | 2/2022 | Andrade | A62B 35/0018 |

* cited by examiner

*Primary Examiner* — Ko H Chan

(57) ABSTRACT

A web harness system includes a sub-pelvic support portion. A leg harness portion is connected to the sub-pelvic support portion. The leg harness portion including: a first leg extension connected to a first portion of the sub-pelvic support portion; a second leg extension connected to a second portion of the sub-pelvic support portion; a right leg adjustment belt connected to the first leg extension; and a left leg adjustment belt connected to the second leg extension.

20 Claims, 5 Drawing Sheets

WEB HARNESS SYSTEM WITH LEG COMPONENTS

BACKGROUND

Field

The embodiments relate to fall protection harnesses, and in particular to fall protection harness leg component configurations.

Description of the Related Art

Workers that work in elevated environments may employ fall protection gear, such as a fall protection harnesses and belts.

SUMMARY

Some embodiments relate to fall protection harnesses that include leg support components with leg extensions for each leg. One embodiment provides a web harness system that includes a sub-pelvic support portion. A leg harness portion is connected to the sub-pelvic support portion. The leg harness portion including: a first leg extension connected to a first portion of the sub-pelvic support portion; a second leg extension connected to a second portion of the sub-pelvic support portion; a right leg adjustment belt connected to the first leg extension; and a left leg adjustment belt connected to the second leg extension.

Other aspects and advantages of the present invention will become apparent from the following detailed description, which, when taken in conjunction with the drawings, illustrate by way of example the principles of the invention.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of fall protection web harness systems including protection elements and adjustable accessory configurations, as well as operation and/or component parts thereof. While the following description will be described in terms of fall protection web harness belts, systems and devices for clarity and to place the invention in context, it should be kept in mind that the teachings herein may have broad application to all types of systems, devices and applications.

Some embodiments relate to fall protection harnesses that include a sub-pelvic strap leg support components with leg extensions for each leg. One embodiment of the invention provides a web harness system that includes a sub-pelvic support portion. A leg harness portion is connected to the sub-pelvic support portion. The leg harness portion including: a first leg extension connected to a first portion of the sub-pelvic support portion; a second leg extension connected to a second portion of the sub-pelvic support portion; a right leg adjustment belt connected to the first leg extension; and a left leg adjustment belt connected to the second leg extension The embodiments of the invention create an easy-don body forming system that makes the web harness embodiments with sub-pelvic strap and the leg extension portions and elements assist in further support and comfort.

Figure 1:
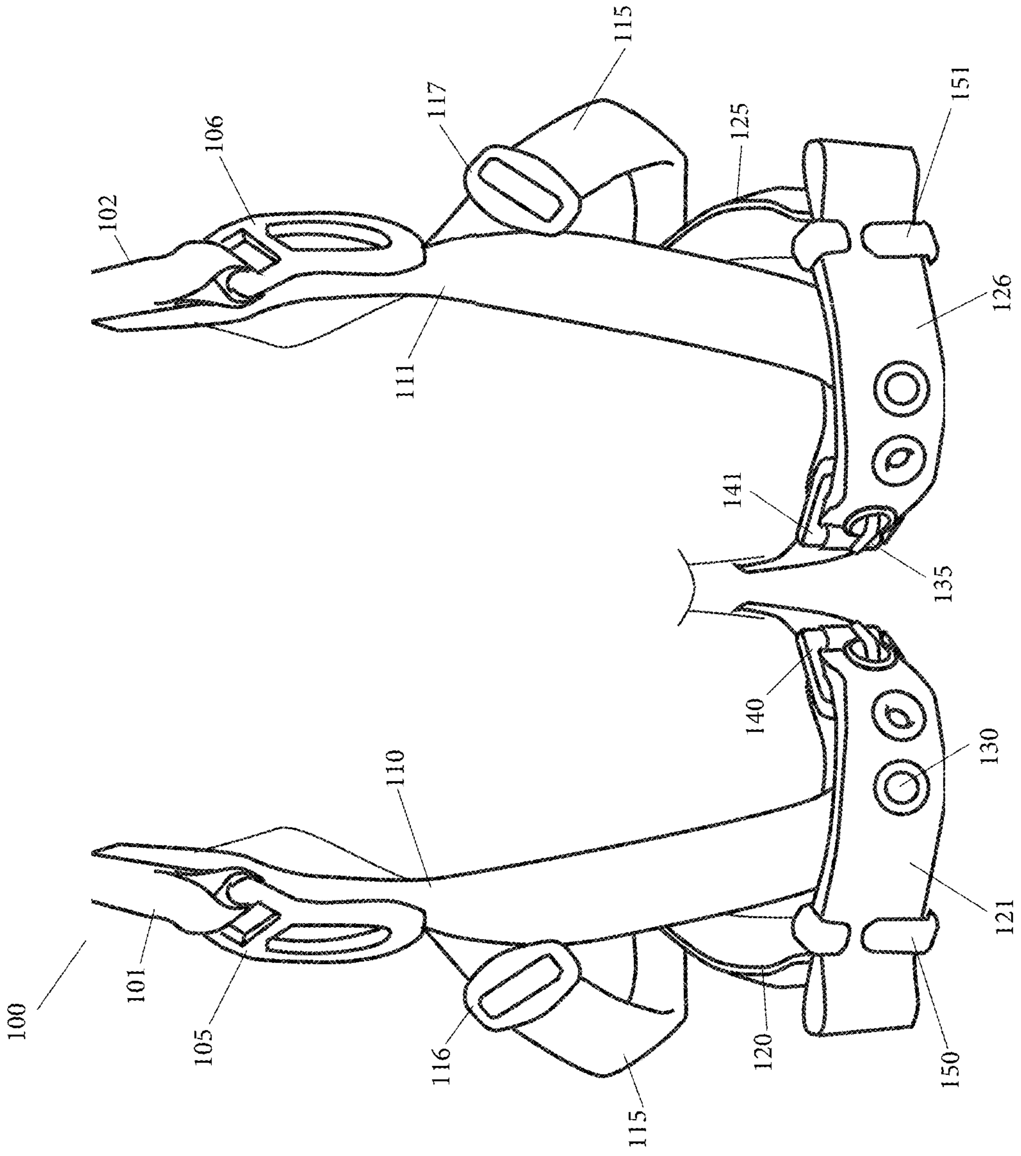
FIG. 1 illustrates a front view of a web harness system shown with harness webbing, sub-pelvic strap and leg support components with leg extension elements for each leg, according to one embodiment of the invention.

FIG. 1 illustrates a front view of a web harness system 100 shown with harness webbing (e.g., webbing 101, 102), sub-pelvic strap 115 and leg support components with leg extension elements 170/175 (FIG. 3) for each leg, according to one embodiment of the invention. In one embodiment, the web harness system 100 includes ring connectors 105/106, lower webbing 110/111, the sub-pelvic strap 115, adjustment buckles 116/117, leg straps 121/126 with adjustment openings 130 for the buckle 140/141 pin 135, leg supports 120/125 and loose strap clips 150/151. In some embodiments, the leg straps 121/126 are uniquely equipped with multiple (e.g., seven (7), nine (9), etc.) grommeted adjustment positions for a wider range of fit. In one or more embodiments, nearly any form of adjustable buckle may be substituted in place of the buckles 140/141 and the associated components. One or more embodiments may include buckle 140/141 alternatives, such as quick connect buckles, varying mating buckle styles, traditional tongue and buckle (similar to a belt with a buckle and tine), pass-through buckles, cam adjuster buckles, ratchet adjustment buckles, etc.

In some embodiments, the adjustment of the leg straps 121/126 with buckles 140/141 (or any other buckle, ratchet buckle, etc.), includes lacing any variable amount of excess webbing through the buckles 140/141 to the end user's desired, ultimate strap length. This adjustment provides for a more precise and tailored fit throughout the hip/buttock section of any end user. The fixed length sub-pelvic straps (sub-pelvic strap 115, leg supports 120/125) limit mobility, and provide proper harness fitment and comfort. The adjustable sub-pelvic strap 115 ensures a proper fit, allowing maximum comfort for all body types.

In one example embodiment, elements or portions of the web harness system 100 may be made of any flexible or non-flexible plastic composites, including but not limited to: EVA, polyethylene (PE), polypropylene (PP), expanded polyethylene (EPE), nylon, polyoxymethylene (POM), etc. In other examples, other similar materials may be used, such as metals and metal alloys (e.g., steel, steel alloy, aluminum, etc.), or resin materials such as fiberglass, carbon fiber, epoxies, etc.

In some embodiments, the webbing 101/102 may be made of webbing polyester and has a 5,000 lb. minimum static strength. The buckles 140/141 and adjusters may be made of aluminum alloy and plated alloy steel (e.g., min. 3,372 lb. minimum static strength).

Figure 2:
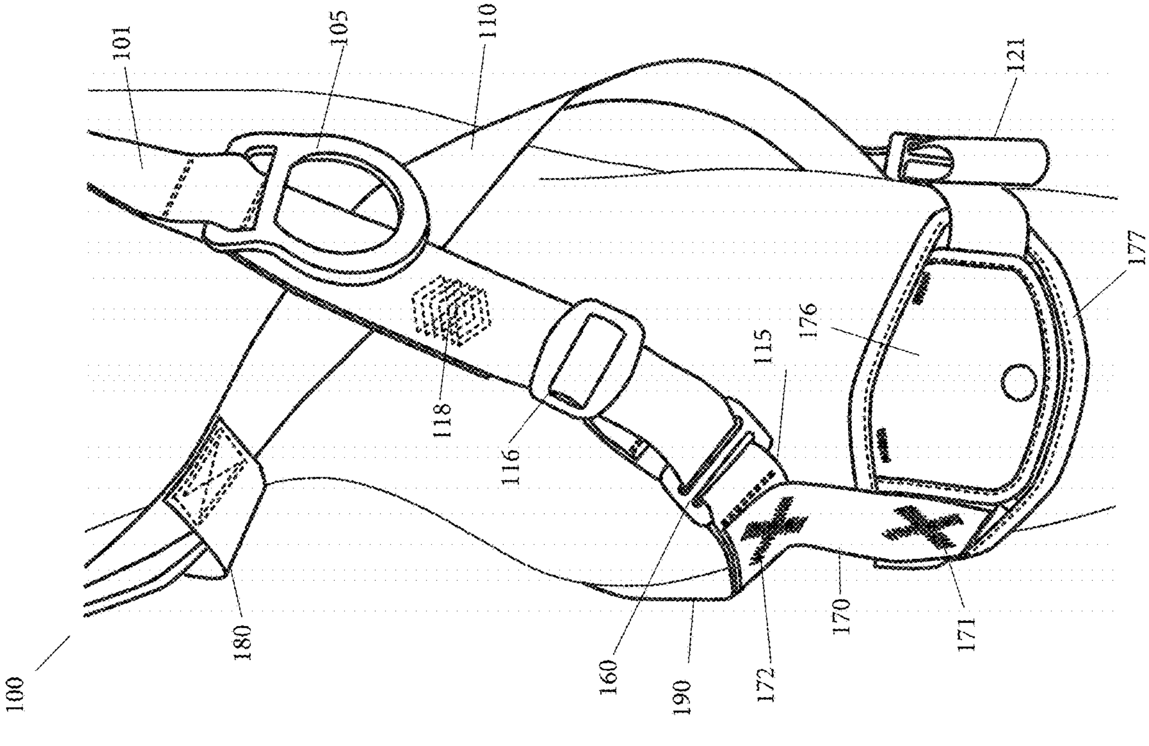
FIG. 2 illustrates a right side view of the web harness system of FIG. 1 shown with harness webbing, sub-pelvic strap and leg support components with leg extension elements for each leg, according to one embodiment of the invention.

FIG. 2 illustrates a right side view of the web harness system 100 of FIG. 1 shown with harness webbing (e.g., webbing 101, 102), sub-pelvic strap 115 and leg support components with leg extension elements 170 (175, FIG. 3) for each leg, according to one embodiment of the invention. As shown, the web harness system 100 further includes a sub-pelvic support portion 190 of the sub-pelvic strap 115. In some embodiments, the web harness system 100 includes outside leg support and padding 177 and storage pouch 176. In one or more embodiments, the web harness system 100 includes multiple stitching reinforcements 118 on various places of webbing overlapping portions for additional structure reinforcement. In some embodiments, additional "X" reinforcement stitching 171 and/or 172 may be included for reinforcement attachment between the leg extension elements 170 (175, FIG. 3) and the sub-pelvic strap 115 and the exterior portion of the padding 177. Further shown is the rear support strap 180. In some embodiments, the web-harness system 100 includes connectors 160/161 that connect the webbings 101/102 to the sub-pelvic strap 115 for adjustment via the adjustment buckles 116/117.

In some embodiments, the padding 177 components are removable or permanently fixed (e.g., stitching, fasteners, heat welding, etc.). In one embodiment, when the padding 177 components are removable, the padding 177 components are attachable via snapping a snap(s) (or attaching hook and loop fasteners, etc.) when the padding 177 components of each side are placed in position over the respective leg support 120/125 webbing. In one embodiment, the padding 177 components may include storage to stow small items or tools in a front compartment. In one embodiment, the padding 177 may include multiple materials for the outer portion, the padding portion, etc. In one embodiment, the padding portion may be vented and made of a compressible cushion material, foam material, air bladder(s), gel(s), etc.

In one or more embodiments, the adjustable sub-pelvic strap 115 provides users to create a perfect fit for their shape in the proper size harness. This results in no more sizing up and dealing with excess torso adjustment webbing. The lateral leg strap construction greatly improves mobility and comfort.

Figure 3:
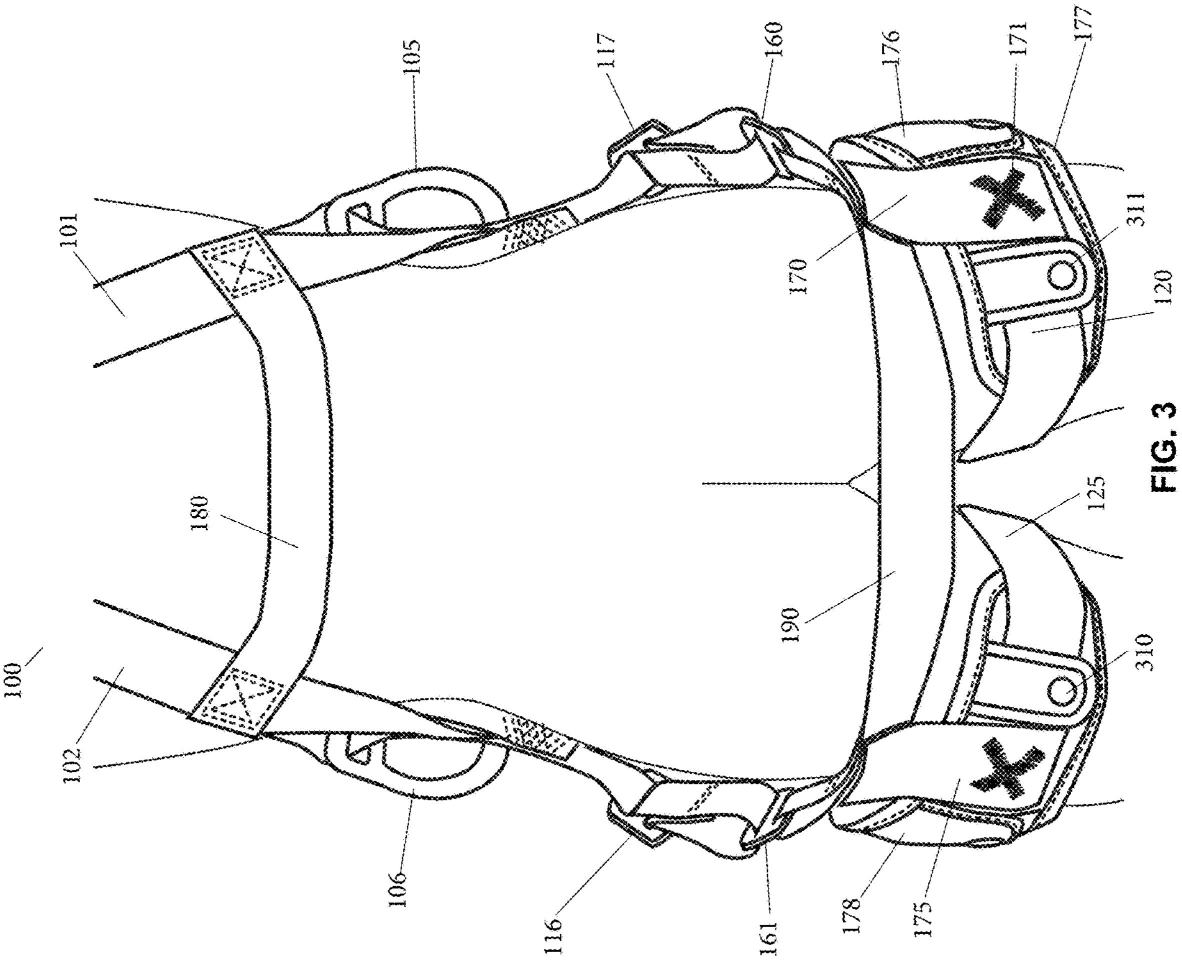
FIG. 3 illustrates a rear view of the web harness system of FIG. 1 shown with harness webbing, sub-pelvic strap and leg support components with leg extension elements for each leg, according to one embodiment of the invention.

FIG. 3 illustrates a rear view of the web harness system 100 of FIG. 1 shown with harness webbing (e.g., webbing 101, 102), sub-pelvic strap 115 and leg support components with leg extension elements 170/175 for each leg, according to one embodiment of the invention. In some embodiments the sub-pelvic support portion 190 is horizontal or near horizontal above the leg supports (harness webbing) 120/125. The adjustable buckles on both left and right sides of the sub-pelvic. The adjustment buckles 116/117 provide adjustability for the sub-pelvic strap 115 and sub-pelvic support portion 190 for comfort and support. The overlap snap portions 310/311 provide additional fixing of the leg supports 120/125 to maintain position and reduce friction on the wearer's legs. The storage pouches 176/178 provide storage of small items and also assist in securing the leg supports 120/125 to maintain position and reduce friction on the wearer's legs.

In some embodiments, the right leg support 120 is fixed to the right leg extension element 170 with reinforcement stitching 171 (e.g., heavy multiple overlap stitching, patterned overlapped stitching, fasteners, etc.). In other embodiments, the right leg support 120 is removably fixed to the right leg extension element 170 with the reinforcement stitching 171 that is adjustable (e.g., a loop with an adjuster component or adjustable stops that prevent movement, etc.). In one or more embodiments, the left leg support 125 is fixed to the left leg extension element 175 with reinforcement stitching 171 (e.g., heavy multiple overlap stitching, patterned overlapped stitching, fasteners, etc.). In other embodiments, the left leg support 125 is removably fixed to the left leg extension element 175 with the reinforcement stitching 171 that is adjustable (e.g., a loop with an adjuster component or adjustable stops that prevent movement, etc.). In some embodiments, the right leg extension element 170 extends to the right leg support 120 a distance (e.g., 6 in., 8 in., etc.). In one embodiment, the right leg extension element 170 and the left leg extension element 175 are parallel or near parallel (e.g., offset by 3 deg., 5 deg., etc.) to one another and are perpendicular or near perpendicular (e.g., offset by 3 deg., 5 deg., etc.) to the sub-pelvic support portion 190 of the sub-pelvic strap 115 and to the respective left leg support 125 or right leg support 120.

In one or more embodiments, the instructions for the use of the web harness system 100 include the following. After inspecting the web harness system 100, the user should grab the dorsal (back) D-ring 410 (FIG. 4) and shake the web harness system 100 to ensure all straps are tangle free. Next, the user should unfasten all buckles 140/141 (and front connectors). Next, the user should place one arm through the web harness system 100 and then ensure that the dorsal D-ring 410 is on the back. Next, the user should place the other arm through the other side of the web harness system 100 and position all the straps. The user should then reach between the legs and pull one leg support 120/125 strap forward. Next the user passes the end of the leg strap 121/126 through the buckle 140/141. These steps are repeated for both leg straps. The leg straps 121/126 are attached to the web harness system 100 at the sub-pelvic support portion 190, which is one of the main load bearing straps in the web harness system 100. Next, the user should ensure the sub-pelvic strap 115 fits snug under the buttocks. Then, the user should connect the chest strap (not shown) by a attaching a mating buckle. Next, the user adjusts the torso straps, and readjusts the leg straps 121/126 and the chest strap if necessary. The ideal position for the chest strap is about six inches below the shoulders. Then, the user should adjust a waist belt to a snug fit, if applicable. Next, the user should ensure that all appropriate buckles are fastened and that the strap ends are secured. Then, the user should ensure that the dorsal D-ring 410 (FIG. 4) and sternal (if so equipped) D-ring are each correctly positioned. The sternal D-ring should be in the center of the chest, between the pectoral muscles, above the solar plexus. The dorsal D-ring 410 must be centered between the shoulder blades.

Figure 4:
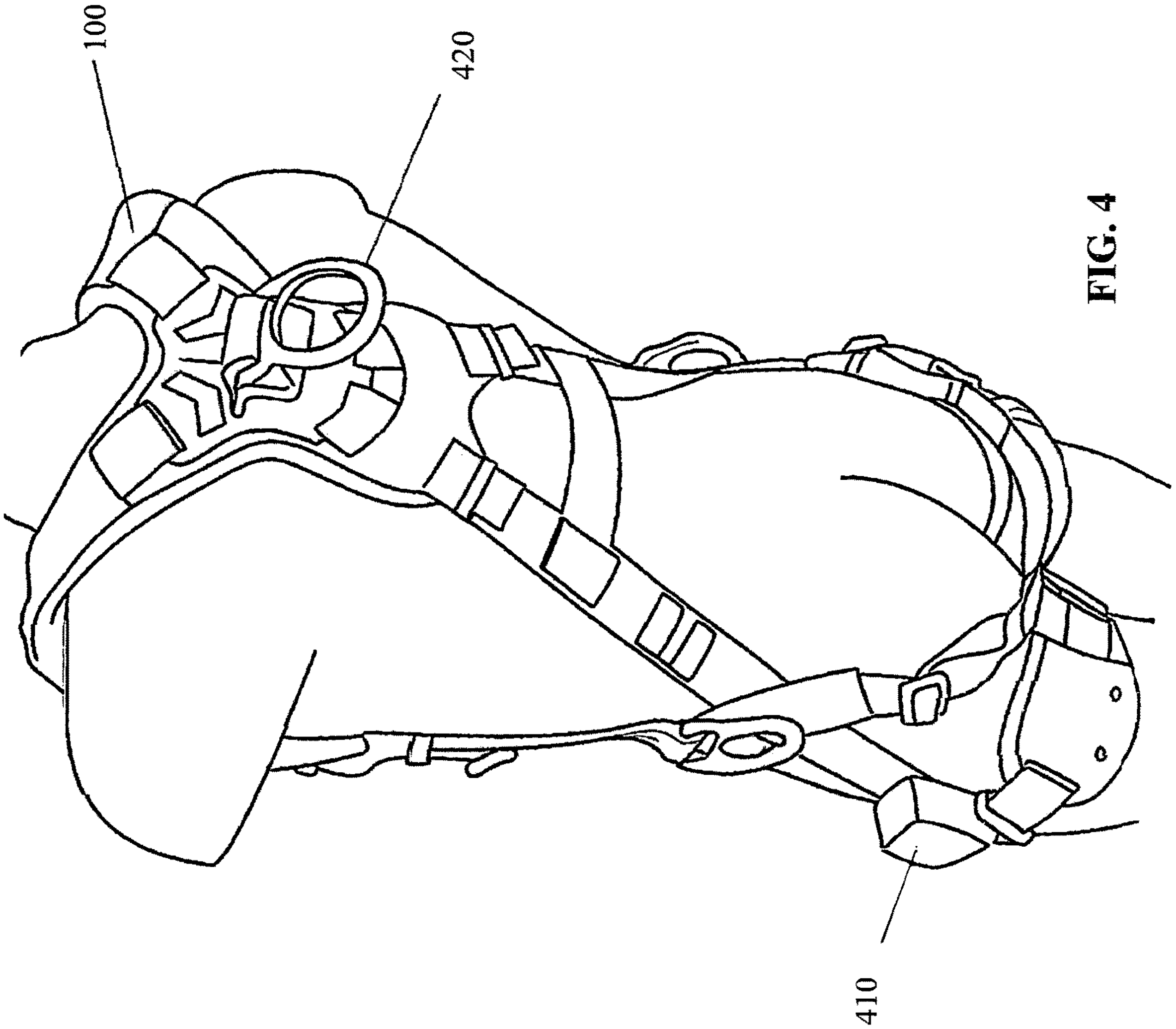
FIG. 4 illustrates a perspective image of an example embodiment of a web harness system shown with harness webbing, sub-pelvic strap and leg support components with leg extension elements for each leg, according to one embodiment of the invention.

FIG. 4 illustrates a perspective image of an example embodiment of a web harness system 100 shown with harness webbing (e.g., webbing 101, 102, FIG. 3), sub-pelvic strap 115 (FIG. 2) and leg support components with leg extension elements 170/175 (FIG. 3) for each leg, according to one embodiment of the invention. In this example embodiment, a large D-ring 420 in the back of the web harness system 100 may be used for fall protection devices, such as energy absorbers, self-retracting devices (SRDs) (e.g., self-retracting lifelines (SRLs), etc.), etc.

In some embodiments, the web harness system 100 includes a dorsal D-ring 420 plate and slip-resistant connectors that minimize slippage for maximum comfort and minimal adjustment throughout the day. The shoulder pad material is abrasion resistant to mitigate excess wear and keep the harness in service longer. Gel padding material disperses harness loads, eliminating hot spots and pressure points for all-day comfort. A durable lanyard keeper design improves versatility and reusability while maintaining ANSI compliance.

In some embodiments, suspension trauma relief components 410 (left and right) helps minimize the effect of being suspended while awaiting rescue. The adjustable length step-in loop design of the suspension trauma relief components 410 accommodates both of the user's feet (upon deployment) to relieve pressure and improve balance.

In one or more embodiments, the leg supports 120/125 comprise lateral leg straps that greatly improve both mobility and comfort. These form-fitting leg supports 120/125 include webbing straps that wrap easily around the user's thighs—away from sensitive pinch points. In some embodiments, the shoulder harness portion includes a neoprene-lined shoulder pad that reduces neck abrasion, enhancing harness comfort for all day long usage. The D-ring 420 includes a component that positions the D-ring 420 correctly (for SRL deployment) and keeps harness adjustments to a minimum throughout the day. In some embodiments, the web harness system 100 may have a static strength of 3600 lb. minimum; the ANSI user capacity may range between 130 lbs. to 310 lbs. maximum; and the OSHA user capacity may range between 130 lbs. to 425 lbs. maximum. The web-harness system 100 may be made in different sizes (e.g., XS, small, medium, large, XL, 2XL, 3XL, etc.).

Figure 5:
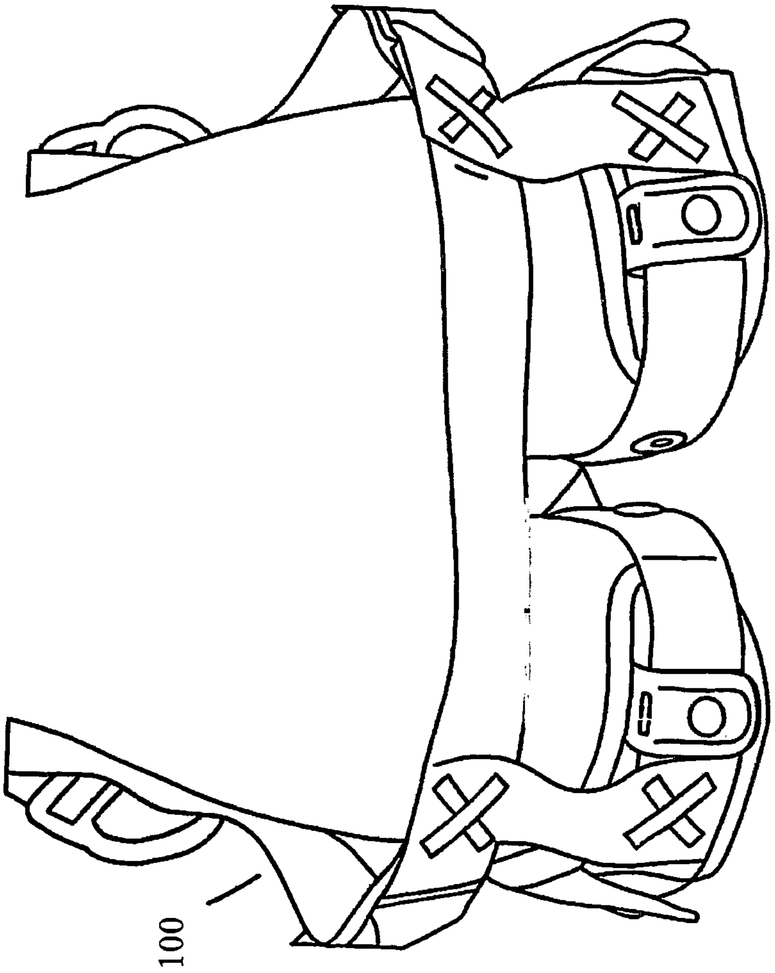
FIG. 5 illustrates a rear image of the example embodiment shown in FIG. 4, according to one embodiment of the invention.

FIG. 5 illustrates a rear image of an example embodiment of a web harness system 100 shown in FIG. 4 including harness webbing (e.g., webbing 101, 102, FIG. 3), sub-pelvic strap 115 (FIG. 2) and leg support components with leg extension elements 170/175 (FIG. 3) for each leg, according to one embodiment of the invention.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one element. If the specification or claims refer to "an additional" element, that does not preclude there being more than one of the additional elements.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A web harness system comprising:
- an upper webbing portion;
- a lower webbing portion coupled to the upper webbing portion;
- an adjustable sub-pelvic support portion coupled to the lower webbing portion, the adjustable sub-pelvic support portion including a first adjustment component on a first side and a second adjustment component on a second side, and the adjustable sub-pelvic support portion is configured as a strap for placement under a buttocks of a user; and
- a leg harness portion coupled to the adjustable sub-pelvic support portion, the leg harness portion comprising:
  - a first leg extension coupled to a first portion of the adjustable sub-pelvic support portion;
  - a second leg extension coupled to a second portion of the adjustable sub-pelvic support portion;
  - a right leg adjustment belt coupled to the first leg extension; and
  - a left leg adjustment belt coupled to the second leg extension.

2. The web harness system of claim 1, wherein the first leg extension and the second leg extension are each fixed to different portions of the adjustable sub-pelvic support portion.

3. The web harness system of claim 2, wherein the first leg extension and the second leg extension are spaced apart from one another.

4. The web harness system of claim 2, wherein the adjustable sub-pelvic support portion is adjustable via the first adjustment buckle and the second adjustment buckle.

5. The web harness system of claim 2, wherein the right leg adjustment belt comprises a first padding assembly, and the left leg adjustment belt comprises a second padding assembly.

6. The web harness system of claim 5, wherein the first padding assembly includes a first storage portion, and the second padding assembly includes a second storage portion.

7. The web harness system of claim 1, further comprising a rear support strap coupled to a first portion and a second portion of the upper webbing portion.

8. The web harness system of claim 1, further comprising a first ring connector coupled to a left side portion of the lower webbing portion, and a second ring connector coupled to a right side portion of the lower webbing portion.

9. The web harness system of claim 1, further comprising a first suspension trauma relief component coupled to the right leg adjustment belt, and a second suspension trauma relief component coupled to the left leg adjustment belt, wherein the first suspension trauma relief component includes a first adjustable length step-in loop portion, and the second suspension trauma relief component includes a second adjustable length step-in loop portion.

10. A web harness system comprising:
- an adjustable sub-pelvic support portion, the adjustable sub-pelvic support portion including a first adjustment component on a first side and a second adjustment component on a second side, and the adjustable sub-pelvic support portion is configured as a strap for placement under a buttocks of a user; and a leg harness portion coupled to the adjustable sub-pelvic support portion, the leg harness portion comprising:

a first leg extension coupled to a first portion of the adjustable sub-pelvic support portion;

a second leg extension coupled to a second portion of the adjustable sub-pelvic support portion;

a right leg adjustment belt coupled to the first leg extension; and a left leg adjustment belt coupled to the second leg extension.

11. The web harness system of claim 10, wherein the first leg extension and the second leg extension are each fixed to different portions of the adjustable sub-pelvic support portion.

12. The web harness system of claim 11, wherein the first leg extension and the second leg extension are spaced apart from one another.

13. The web harness system of claim 10, wherein the adjustable sub-pelvic support portion is adjustable via the first adjustment buckle and the second adjustment buckle.

14. The web harness system of claim 10, wherein the right leg adjustment belt comprises a first padding assembly, and the left leg adjustment belt comprises a second padding assembly.

15. The web harness system of claim 14, wherein the first padding assembly includes a first storage portion, and the second padding assembly includes a second storage portion.

16. The web harness system of claim 10, further comprising a first suspension trauma relief component coupled to the right leg adjustment belt, and a second suspension trauma relief component coupled to the left leg adjustment belt, wherein the first suspension trauma relief component includes a first adjustable length step-in loop portion, and the second suspension trauma relief component includes a second adjustable length step-in loop portion.

17. A web harness system comprising:

an upper webbing portion forming a shoulder harness;

a lower webbing portion coupled to the upper webbing portion;

an adjustable sub-pelvic support portion coupled to the lower webbing portion, the adjustable sub-pelvic support portion including a first adjustment component on a first side and a second adjustment component on a second side, and the adjustable sub-pelvic support portion is configured as a strap for placement under a buttocks of a user;

a leg harness portion coupled to the adjustable sub-pelvic support portion, the leg harness portion comprising:

a first leg extension coupled to a first portion of the adjustable sub-pelvic support portion;

a second leg extension coupled to a second portion of the adjustable sub-pelvic support portion;

a right leg adjustment belt coupled to the first leg extension; and a left leg adjustment belt coupled to the second leg extension;

wherein the first leg extension and the second leg extension are each fixed to different portions of the adjustable sub-pelvic support portion, and the first leg extension and the second leg extension are spaced apart from one another.

18. The web harness system of claim 17, wherein:

the adjustable sub-pelvic support portion is adjustable via the first adjustment buckle and the second adjustment buckle;

the right leg adjustment belt comprises a first padding assembly;

the left leg adjustment belt comprises a second padding assembly;

the first padding assembly includes a first storage portion; and the second padding assembly includes a second storage portion.

19. The web harness system of claim 17, further comprising:

a rear support strap coupled to a first portion and a second portion of the upper webbing portion;

a first ring connector coupled to a left side portion of the lower webbing portion; and a second ring connector coupled to a right side portion of the lower webbing portion.

20. The web harness system-belt of claim 17, further comprising a first suspension trauma relief component coupled to the right leg adjustment belt, and a second suspension trauma relief component coupled to the left leg adjustment belt, wherein the first suspension trauma relief component includes a first adjustable length step-in loop portion, and the second suspension trauma relief component includes a second adjustable length step-in loop portion.

* * * * *